United States Patent
Miyazaki

[11] 3,961,348
[45] June 1, 1976

[54] LIGHT PATH SWITCHING INDICATOR FOR OPTICAL INSTRUMENTS

[75] Inventor: Kensaku Miyazaki, Machida, Japan

[73] Assignee: Olympus Optical Company Ltd., Tokyo, Japan

[22] Filed: Feb. 21, 1975

[21] Appl. No.: 551,745

[30] Foreign Application Priority Data
Mar. 2, 1974   Japan ............... 49-23754

[52] U.S. Cl. .................... 354/289; 350/160 LC; 354/110; 354/159; 354/210; 354/222
[51] Int. Cl.² ........................................ G03B 17/00
[58] Field of Search ........... 350/160 LC; 356/247, 356/248, 252; 354/110, 159, 210, 219, 221, 222, 223, 289; 352/137

[56] References Cited
UNITED STATES PATENTS

| | | |
|---|---|---|
| 3,011,385 | 12/1961 | Frost .......................... 354/222 |
| 3,108,526 | 10/1963 | Brackett ...................... 354/222 |
| 3,118,014 | 1/1964 | Winkler ........................ 354/222 |
| 3,633,482 | 1/1970 | Tsuda .......................... 354/222 |

*Primary Examiner*—L. T. Hix
*Assistant Examiner*—Russell E. Adams, Jr.
*Attorney, Agent, or Firm*—Ostrolenk, Faber, Gerb & Soffen

[57] ABSTRACT

An indicator comprises a liquid crystal display panel for internally housing patterns to be displayed, and a plurality of switches which are operated in unison with a light path switching mechanism for controlling the operation of the liquid crystal display panel. When an objective path of an optical instrument is connected with either one of a viewfinder path, a photometric path, a photographing path or the like by the action of a light path switching mechanism, the liquid crystal display panel indicates the particular light path with which the objective path is connected.

10 Claims, 5 Drawing Figures

LIGHT PATH SWITCHING INDICATOR FOR OPTICAL INSTRUMENTS

BACKGROUND OF THE INVENTION

The invention relates to a light path switching indicator for optical instruments.

A high performance optical instrument such as a microscope is equipped with a number of branch paths, including a viewfinder path, a photometric path, a photographing path and the like. Unless a clear indication of the switching of the light paths is given, an incorrect manipulation may often be performed without being noticed, with a result that the intended operation can not be accomplished, thereby requiring an otherwise unnecessary repeated operation of the instrument. In particular, when taking pictures, a wrong operation may result in a photographing operation with unloaded film or taking wrong pictures to cause a waste of the film.

In order to overcome such disadvantages and to prevent a wrong operation during the switching process, the prior practice has been to recognize the position of a light path switching shaft or operating handle, or letters and colored markings associated therewith, before initiating an intended operation. However, increasingly complicated optical systems together with the incorporation of various kinds of mechanisms have resulted in a complex structure of the overall optical system, which prevents the disposition of various switching shafts and operating handles in a closely spaced and easily recognizable manner from being achieved. If the disposition of these members to bring them closer together were possible, the resulting arrangement will become extremely complex, disadvantageously causing an increased cost.

When taking pictures, the film size varies with the type of a camera being used, and therefore it is customary to provide a number of masks corresponding to all of the sizes within a viewfinder and to utilize only that mask which is associated with the film being used. However, the presence of a number of masks hinders an immediate recognition of which mask corresponds to the film being used.

SUMMARY OF THE INVENTION

In view of the foregoing, it is an object of the invention to provide a light path switching indicator incorporating a liquid crystal display panel disposed within the light path of a viewfinder or any other position and which produces a display relating to the switching of light paths always at one and the same location and which produces an indication of only that mask or identification thereof which corresponds to a film being used.

In accordance with the invention, when an objective path is connected with a viewfinder path, a photometric path, a photographing path or any other light path by the action of a light path switching mechanism, a liquid crystal display panel located within a viewfinder or any other position clearly indicates a particular light path with which the objective path is currently connected. This permits an immediate recognition and the correction of a wrong operation by an operator, thereby improving the operational efficiency and preventing a waste in time and labor. The liquid crystal display panel is controlled by a plurality of switches which are operated in unison with the light path switching mechanism, thereby simplifying the overall arrangement and assuring a reliable and accurate display.

DETAILED DESCRIPTION OF PREFERRED EMBODIMENT

Figure 1:
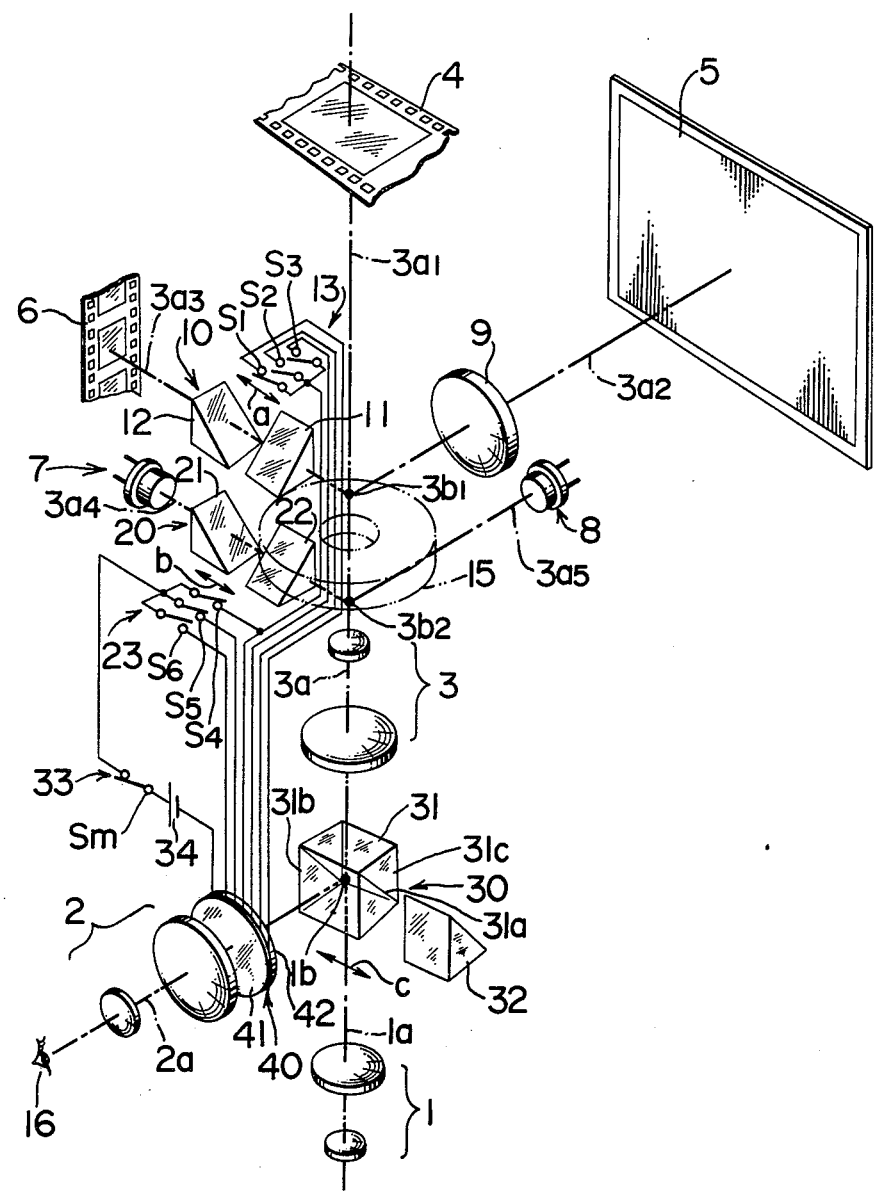
FIG. 1 is an exploded, perspective view of the optical system of a microscope provided with the light path switching indicator according to the invention.

In the description to follow, the invention will be described as applied to a microscope. In the optical system of a microscope shown in FIG. 1, an objective assembly 1 defines an objective light path $1a$, to the left-hand side of which a viewfinder optical system 2 defines a viewfinder light path $2a$ for observation by an eye shown at 16. A picture taking lens assembly 3 disposed directly above the objective path $1a$ defines picture taking path $3a$. A shutter 15, shown of phantom line fashion, is disposed directly above the picture taking path $3a$, and subsequent to the passage through the shutter 15, the picture taking path $3a$ is divided into three branch paths including a picture taking light path $3a1$ in vertical alignment with the picture taking path $3a$ and leading to a 35mm film 4, a second picture taking light path $3a2$ which is bent to the right at a right angle to the picture taking path $3a$ and leading to a large size film 5 through an auxiliary lens 9, and a third picture taking light path $3a3$ which is bent to the left at a right angle to the picture taking path $3a$ and leading to a cine film 6. Before passing through the shutter 15, the picture taking path $3a$ also includes a pair of additional branch paths, including a light intensity determining path $3a4$ which is bent to the left at a right angle to the path $3a$ and incident on a light intensity determining element 7, and a color temperature measuring light path $3a5$ which is bent to the right at a right angle to the path $3a$ and incident on a color temperature measuring element 8.

To the left and in the vicinity of a point $3b1$ where the light paths $3a1$, $3a2$ and $3a3$ leading to the respective films 4, 5 and 6 branch from the picture taking light path $3a$ is located a picture taking path switching mechanism 10, which essentially comprises a first prism 11 for the picture taking light path of a large size film, a second prism 12 for the cine taking path and a drive mechanism (not shown) which translationally moves the prisms 11 and 12 simultaneously in the directions indicated by a double-ended arrow $a$. When both of the prisms 11 and 12 are located out of the branch point $3b1$ by the operation of the switching mechanism 10, as shown in FIG. 1, the picture taking path $3a$ is connected with 35mm taking path $3a1$, When the switching mechanism operates to locate the first prism 11 on the branch point $3b1$, the picture taking path $3a$ is connected with the large size film taking path $3a2$. Additionally, when the switching mechanism 10 operates to locate the second prism 12 on the branch point $3b1$, the picture taking path $3a$ is connected with the cine taking path 3a3.

To the right and in the vicinity of the switching mechanism 10 is shown a picture taking path switching assembly 13 which is operated in unison with the operation of the switching mechanism 10. The switching assembly 13 comprises switches S1, S2 and S3. The switch S1 is adapted to be closed when the both of the prisms 11, 12 are located out of the branch point 3b1 to connect the picture taking path 3a with the 35mm taking path 3a1. The switch S2 is adapted to be closed when the prism 11 is located on the branch point 3b1 to connect the picture taking path 3a with the large size film taking path 3a2. Finally, the switch S3 is adapted to be closed when the prism 12 is located on the branch point 3b1 to connect the picture taking path 3a with the cine size taking path 3a3.

To the left and in the vinicity of a point 3b2 where the optical paths 3a4 and 3a5 leading to the respective photometric elements 7, 8 branch from the picture taking path 3a is located a photometric path switching mechanism 20, which essentially comprises a first prism 21 for the path which determines the amount of light, a second prism 22 for the path which determines color temperature, and a drive mechanism (not shown) which translationally moves the prisms 21 and 22 simultaneously in the directions indicated by a double-ended arrow b. When the photometric path switching mechanism 20 is operated so that both of the prisms 21 and 22 are located out of the branch point 3b2 as shown in FIG. 1, the light from the picture taking light path 3a passes straightforward toward the branch point 3b1. When the switching mechanism 20 operates to locate the prism 21 on the branch point 3b2, the picture taking light path 3a is connected with the light path 3a4 for determining the amount of light. Finally, when the switching mechanism 20 operates to locate the prism 22 on the branch point 3b2, the picture taking light path 3a is connected with the light path 3a5 for determining a color temperature.

To the left and in the vicinity of the photometric path switching mechanism 20 is located a switching assembly 23 which is operated in unison with the switching mechanism 20. The switching assembly 23 includes switches S4, S5 and S6. The switch S4 is adapted to be closed when the both prisms 21, 22 are located out of the branch point 3b2 so that the light from the picture taking light path 3a passes through the branch point 3b2 straightforward toward the branch point 3b1; the switch S5 is adapted to be closed when the prism 22 is located on the branch point 3b2 to connect the picture taking light path 3a with the color temperature determining path 3a5; and the switch S6 is adapted to be closed when the prism 21 is located on the branch point 3b2 to connect the taking light path 3a with the light path 3a4 for determining the amount of light.

A viewfinder path switching mechanism 30 is located at the position of a point 1b where the viewfinder light path 2a and the picture taking light path 3a branch from the objective light path 1a. The switching mechanism 30 essentially comprises a first prism 31 for the viewfinder and picture taking light paths, a second prism 32 for the viewfinder light path, and a drive mechanism (not shown) for translationally moving the prisms 31 and 32 simultaneously in the directions indicated by a double ended arrow c. The prism 31 comprises a pair of prisms 31b, 31c with a half-mirror 31a interposed therebetween so as to form an integral assembly, and when the half-mirror 31a it is located on the branch point 1b as shown in FIG. 1 by the operation of the viewfinder light path switching mechanism 30, the objective light path 1a is connected with both the viewfinder light path 2a and the picture taking light path 3a. On the other hand, when the prism 32 is located on the branch point 1b, the objective light path 1a is connected only with the viewfinder light path 2a.

To the left of the viewfinder path switching mechanism 30 is located a switching assembly 33 for the viewfinder path which is operated in unison with the viewfinder path switching mechanism 30. The assembly 33 includes a main switch Sm which is adapted to be closed when the prism 31 is located on the branch point 1b as shown in FIG. 1.

Figure 2:
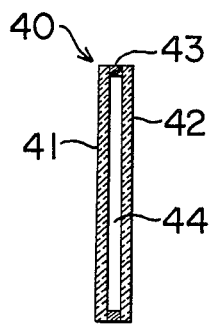
FIG. 2 is a cross section of a liquid crystal display panel used in the indicator of the invention.
Figure 3:
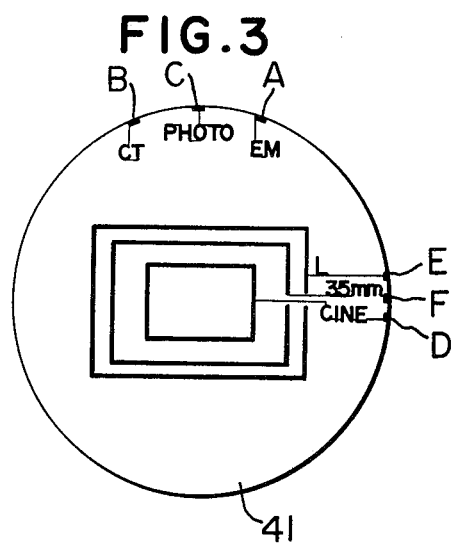
FIGS. 3 and 4 are schematic views illustrating the pattern of transparent electrodes provided on the liquid crystal display panel.
Figure 5:
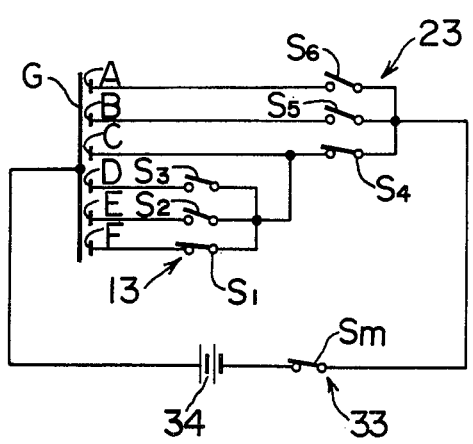
FIG. 5 is a circuit diagram showing the interconnection between the transparent electrodes and switches which are operated in unison with the light path switching mechanism.
Figure 4:
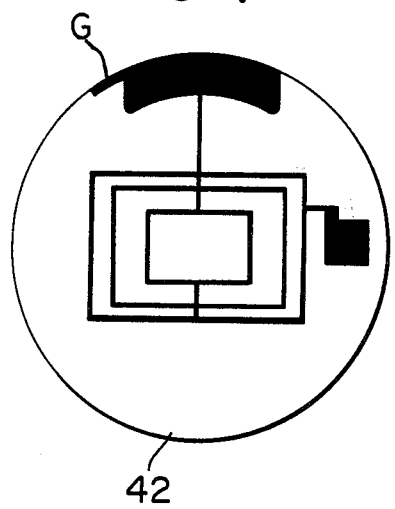

A liquid crystal display panel 40 is located on the viewfinder light path 2a, and is connected with a power source 34 as well as each of the switches S1 to S6 and Sm. As illustrated in FIG. 2, the liquid crystal display panel 40 comprises a pair of substrates 41, 42 formed of a transparent plate such as glass on which a transparent electrode of a given pattern is applied, with spacers 43 being interposed therebetween, and a liquid crystal 44 is confined in the space defined therebetween. The pattern of the transparent electrodes may be formed as illustrated in FIGS. 3 and 4. The pattern shown in FIG. 3 is applied on the substrate 41 which is located outside or nearer the eye 16 viewing the viewfinder, and the pattern shown in FIG. 4 is applied on the rear side, that is, on the substrate 42 which is located nearer the branch point 1b as viewed in FIG. 1. FIG. 5 shows a circuit connection of these transparent electrodes having the respective patterns illustrated. Electrode terminals A, B, C, D, E and F are connected with the switches S6, S5, S4, S3, S2 and S1, respectively, and the other terminals of the switches S1 to S3 are connected with one terminal of the switch S4 with which the electrode terminal C is connected, while the other terminals of the switches S4 to S6 are connected through the switch Sm with the negative terminal of the power source 34, the positive terminal of which is connected with an electrode terminal G.

The drive mechanisms used in connection with the path switching mechanisms 10, 20 and 30 in the indicator according to the invention may be of any configuration which translationally or rotationally moves the prisms. Because their specific arrangement is considered to be obvious by one skilled in the art, they are not specifically illustrated herein. It should be understood that the prisms 11, 12, 21, 22 and 32 may by replaced by suitable reflecting mirrors while the prism 31 may be replaced by a conventional half-mirror.

The operation of the indicator according to the invention will now be described. Assuming that the prisms 11, 12 of the taking path switching mechanism 10 as well as the prisms 21, 22 of the photometric path switching mechanism 20 are in their left-most positions and thus displaced from the respective branch points 3b1 and 3b2, respectively, and that the viewfinder path switching mechanism 30 causes the viewfinder and picture taking path prism 31 to be located on the branch point 1b, as shown in FIG. 1, the switch S1 in the picture taking path switching assembly 13, the switch S4 in the photometric path switching assembly 23 and the main switch Sm in the viewfinder path switching assembly 33 will by all closed (see FIG. 5). As a result, a voltage will be applied to the electrodes C and F, whereby the liquid crystal will lose transparency in the associated regions, whereby the identifying characters "PHOTO" and "35mm" as well as the corresponding mask will appear. When only the picture taking path switching assembly 10 is operated under this condition so as to locate the prism 11 associated with the large size film on the branch point 3b1, the switch S1 will be opened while the switch S2 of the switching assembly 13 will be closed. Consequently, a voltage will be applied to the electrodes C and E, whereby the identifying characters "35mm" and its associated mask will disappear and replaced by the character "L" identifying a large size film and its associated mask, with the characters "PHOTO" remaining. When the picture taking path switching mechanism 10 alone is further operated so as to locate the prism 12 associated with the cine film path on the branch point 3b1 under this condition, the switch S3 in the picture taking path switching assembly 13 is closed, whereby the character "L" indicating a large size film and its associated mask will disappear and the identifying characters "CINE" and its associated mask will appear. When the photometric path switching mechanism 20 is operated to locate the prism 22 for the color temperature determining path on the branch point 3b2, the switch S4 is opened while the switch S5 of the switching assembly 23 will be closed, whereby the masks will all disappear, leaving only the characters "CT" indicating the photometry of a color temperature. When the photometric path switching mechanism 20 is operated to bring the prism 21 associated with the path for determining the amount of light onto the branch point 3b1, the switch S6 in the switching assembly 23 will be closed, whereby the characters "EM" indicating the photometry of the amount of light will appear alone. When the photometric path switching mechanism 20 is operated so as to place either prism 21 or 22 on the branch point 3b2, the light from the picture taking lens 3 will not reach any of the films 4, 5 and 6. At this time, the switch S4 in the photometric path switching assembly 23 which is operated in unison with the photometric path switching mechanism 20 is opened, so that no mask will appear regardless of the status of the switching assembly 13 which is operated in unison with the taking path switching mechanism 10, because of the circuit interruption by the switch S4, as will be readily apparent from FIG. 5. When the viewfinder path switching mechanism 30 is operated so as to locate the prism 32 associated with the viewfinder path on the branch point 1b, the light from the objective lens 1 is only allowed to pass to the viewfinder path 2a, thus permitting only the observation through the viewfinder optical system. Since the main switch Sm in the viewfinder path switching assembly 33 which is operated in unison with the viewfinder path switching mechanism 30 is opened, nothing appears on the liquid crystal display panel 40.

It should be understood that the above disclosure is only illustrative of and not limitative of the present invention. The disposition of the various films and photometric elements can be changed as desired. While the above disclosure deals with a microscope, it should be understood that the invention is equally applicable to any other optical instruments incorporating several optical systems. It will be appreciated that the optical systems in the various separate optical paths which are to be connected with the objective light path may vary in arrangement and construction as does the construction of the various switching assemblies, together with a corresponding change in the pattern of transparent electrodes on the liquid crystal display panel. The location of the liquid crystal display panel is not limited to the viewfinder path, but it may be located at any position on the exterior of the optical instrument which is visually accessible.

What is claimed is:

1. A light path switching indicator for use in a viewing instrument comprising first means establishing an objective light path, a plurality of means for establishing separate light paths which are each adapted to be selectively connected with the objective light path, a light path switching mechanism for selectively connecting at least one of the plurality of separate light path establishing means with the objective light path of said first means, a liquid crystal display panel having means for generating a visually observable pattern indicative of that particular one of the separate light paths which is connected with the objective light path, switching means operated in unison with the light path switching mechanism for controlling the liquid crystal display panel.

2. A light path switching indicator according to claim 1 in which the plurality of means for establishing separate light paths respectively include at least a viewfinder light path means, a picture taking light path means and a photometric light path means.

3. A light path switching indicator according to claim 2 in which the means for establishing a picture taking light path comprises at least one means for establishing a picture taking light path for a 35mm size film, one means for establishing a picture taking light path for a large size film and one means for establishing a picture taking light path for a cine size film.

4. A light path switching indicator according to claim 2 in which the means for establishing a photometric light path further comprises at least one means cooperating with the photometric light path for determining the amount of light and one means cooperating with the photometric light path for determining a color temperature.

5. A light path switching indicator according to claim 1 in which the light path switching mechanism includes a plurality of optical prisms and means for selectively aligning said prisms with said objective light path for selectively optically coupling said separate light paths therewith.

6. A light path switching indicator according to claim 1 in which the liquid crystal display panel is disposed on the viewfinder light path.

7. A light path switching indicator according to claim 1 in which the liquid crystal display panel includes a pattern indicative of a 35mm size photographing operation and its associated mask which are made visually observable when a 35mm photographing operation is selected.

8. A light path switching indicator according to claim 1 in which the pattern on the liquid crystal display panel includes selectively visually observable portions respectively indicative of the occurrence of a picture taking operation a light measurement operation and a color temperature measurement operation.

9. The indicator of claim 8 wherein said panel further comprises a selectively visually observable indication of the film size selected by said switching means.

10. The indicator of claim 9 wherein said panel further comprises pattern portions each respectively associated with said film size indications for creating a visually observable mask whose size coincides with the visually observable film size which has been selected.

* * * * *